(12) United States Patent
Gorensek

(10) Patent No.: US 8,956,526 B2
(45) Date of Patent: Feb. 17, 2015

(54) HYBRID SULFUR CYCLE OPERATION FOR HIGH-TEMPERATURE GAS-COOLED REACTORS

(75) Inventor: Maximilian B. Gorensek, Aiken, SC (US)

(73) Assignee: Savannah Nuclear Solutions, LLC, Aiken, SC (US)

( * ) Notice: Subject to any disclaimer, the term of this patent is extended or adjusted under 35 U.S.C. 154(b) by 225 days.

(21) Appl. No.: 13/570,516

(22) Filed: Aug. 9, 2012

(65) Prior Publication Data

US 2014/0042034 A1 Feb. 13, 2014

(51) Int. Cl.
*C25B 1/04* (2006.01)
*C01B 17/74* (2006.01)

(52) U.S. Cl.
USPC ............................................. 205/637

(58) Field of Classification Search
CPC .......... C01B 17/503; C25B 1/04; C25B 15/08
USPC ....................................................... 205/637
See application file for complete search history.

(56) References Cited

U.S. PATENT DOCUMENTS

| 3,888,750 A | 6/1975 | Brecher et al. |
| 4,412,895 A | 11/1983 | Lu |
| 7,645,437 B1 | 1/2010 | Moore et al. |
| 7,976,693 B2 | 7/2011 | Lahoda et al. |
| 8,366,902 B2 * | 2/2013 | Hawkes et al. ............... 205/637 |
| 2005/0077187 A1 | 4/2005 | Nakagiri |
| 2009/0122943 A1 * | 5/2009 | Peter ............................. 376/391 |

FOREIGN PATENT DOCUMENTS

WO WO2007004997 1/2007

OTHER PUBLICATIONS

Schultz et al. "The Hydrogen Reaction," Nuclear Engineering International, vol. 50, pp. 10-19, 2005.*
Maximillian B. Gorensek, Hybrid sulfer cycle flowsheets for hydrogen production using high-temperature gas-cooled reactors; International Journal of Hydrogen Energy 36 (2011) 12725-12741, Hydrogen Energy Publications, LLC.
Maximillian B. Gorensek and Thomas B. Edwards; Energy Efficiency Limits for a Recuperative Bayonet Sulfuric Acid Decomposition Reactor for Sulfur Cycle Thermochemical Hydrogen Production, Ind. Eng. Chem Res 2009, 48, 7232-7245; 2009 American Chemical Society.
I.T. Ozturk, A. Hammache and E. Bilgen; Enercy Convers. Mgmt. vol. 36, No. 1 pp. 11-21, 1995, 1995 Elsevier Science Ltd., Great Britain.

* cited by examiner

*Primary Examiner* — Nicholas A Smith
(74) *Attorney, Agent, or Firm* — Bennett Mullinax, LLC

(57) ABSTRACT

A hybrid sulfur (HyS) cycle process for the production of hydrogen is provided. The process uses a proton exchange membrane (PEM) $SO_2$-depolarized electrolyzer (SDE) for the low-temperature, electrochemical reaction step and a bayonet reactor for the high-temperature decomposition step. The process can be operated at lower temperature and pressure ranges while still providing an overall energy efficient cycle process.

5 Claims, 5 Drawing Sheets

HYBRID SULFUR CYCLE OPERATION FOR HIGH-TEMPERATURE GAS-COOLED REACTORS

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

This invention is directed towards the HyS cycle which is an all-fluid thermochemical cycle for splitting water with a high temperature heat source. Originally patented in 1975 by Brecher and Wu in U.S. Pat. No. 3,888,750, and which is incorporated herein by reference, the HyS cycle uses hydrogen, oxygen and sulfur, which is cycled between the +4 and +6 oxidation states. HyS comprises two steps: one is the high-temperature thermochemical decomposition of sulfuric acid ($H_2SO_4$) to sulfur dioxide ($SO_2$), oxygen ($O_2$), and water;

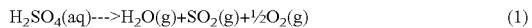

the other is the $SO_2$-depolarized electrolysis of water to $H_2SO_4$ and hydrogen ($H_2$).

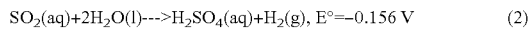

A HyS cycle process was developed for the production of hydrogen from nuclear energy as part of the NGNP (Next Generation Nuclear Plant) program under the Nuclear Hydrogen Initiative (NHI). It uses a proton exchange membrane (PEM) $SO_2$-depolarized electrolyzer (SDE) for the low-temperature, electrochemical reaction step and a novel bayonet reactor for the high-temperature decomposition step. It is the electrochemical nature of this second reaction that makes it a hybrid cycle. The present invention is directed to process and operational improvement to the HyS cycle.

BACKGROUND OF THE INVENTION

This invention relates to the HyS cycle which one of is one of three primary hydrogen production methods that were being developed for the US Department of Energy (DOE) Office of Nuclear Energy (DOE-NE) under the NHI. The technology holds enormous promise for using a high-temperature heat source for hydrogen production.

SUMMARY OF THE INVENTION

It is one aspect of at least one of the present embodiments to provide a hybrid sulfur cycle process comprising the steps of: supplying a heat source of substantially about 750 C; transferring the heat to a bayonet reactor; establishing a decomposition temperature for $H_2SO_4$ within a catalytic bed housed within the bayonet reactor; maintaining a feed pressure of the $H_2SO_4$ within the bayonet reactor of substantially about 12 bars; and maintaining a feed pressure of a heat transfer fluid supplied to the bayonet reactor of substantially between 15-90 bars.

It is another aspect of at least one of the present embodiments to use the hybrid sulfur process wherein the $H_2SO_4$ feedstock concentration in the bayonet reactor is about 76% by weight.

It is another aspect of at least one of the present embodiments to use the hybrid sulfur process wherein the $H_2SO_4$ is concentrated to about 90% by weight within the bayonet reactor.

It is yet another aspect of the present invention to provide a hybrid sulfur process for hydrogen generation, utilizing the decomposition of $H_2SO_4$ to $H_2O$, $SO_2$ and $O_2$ which comprises:

utilizing a sulfur cycle, wherein an electrolyzer provides $H_2SO_4$ liquid to a $H_2SO_4$ vaporizer reactor operating at a temperature of about 750 C and at a pressure effective to provide vaporized gaseous $H_2SO_4$ and the gaseous $H_2SO_4$ is decomposed to gaseous $H_2O$, $SO_2$ and $O_2$ in a decomposition reactor;

passing the $H_2O$, $SO_2$ and $O_2$ gases to quench column to capture a $H_2SO_4$ product with additional gases passing to an electrolyzer unit; inputting electricity to the electrolyzer unit to produce hydrogen gas and a $H_2SO_4$ liquid;

wherein the hybrid sulfur process provides a source for a hydrogen generating process.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Figure 1:
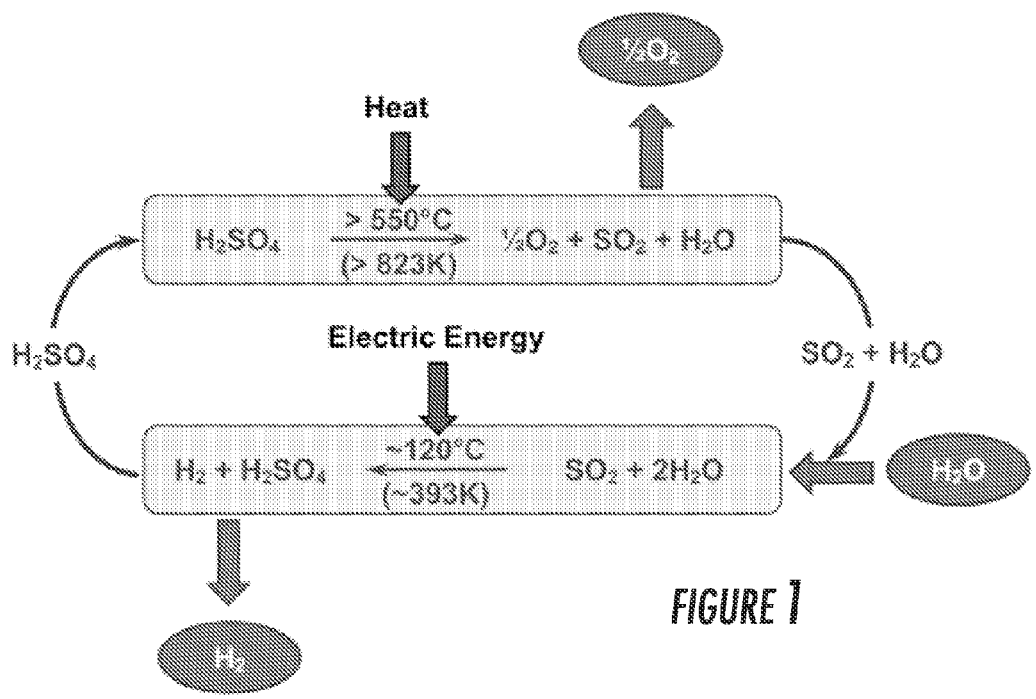
FIG. 1 is a modification of the hybrid sulfur (HyS) cycle in accordance with the operating parameters of the present invention.
Figure 2:
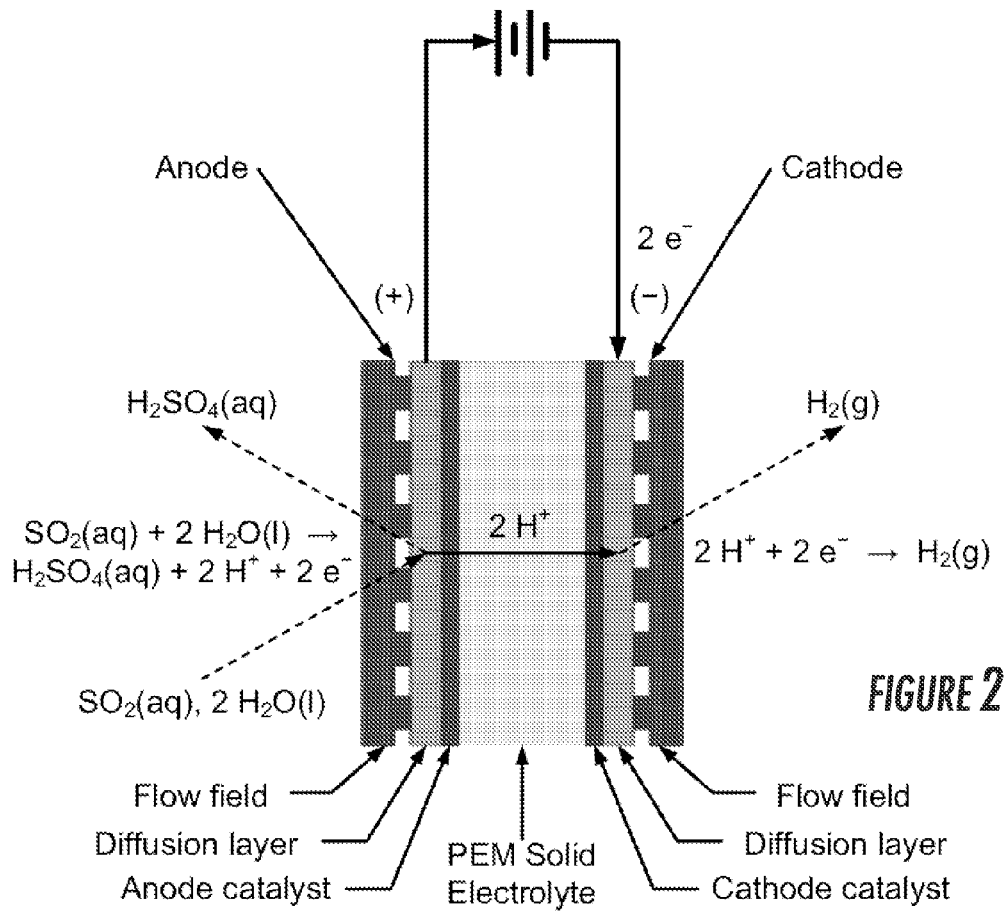
FIG. 2 is a $SO_2$-depolarized electrolyzer (SDE) schematic design having a recirculating anolyte saturated with dissolved $SO_2$.
Figure 3:
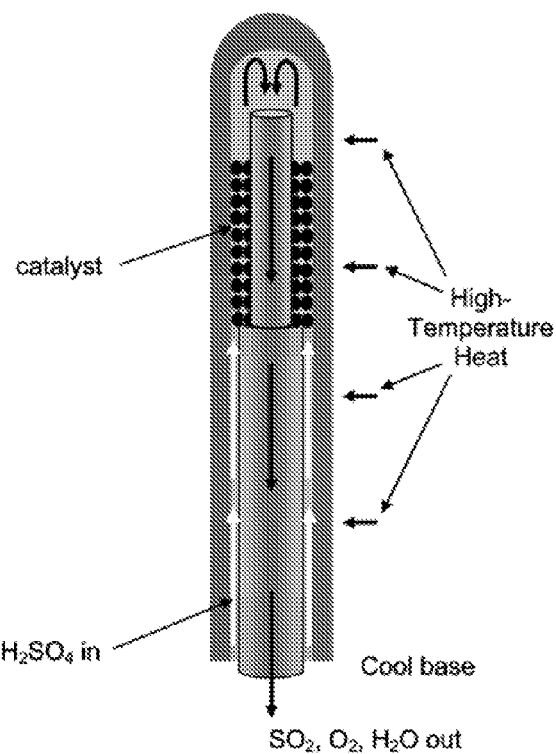
FIG. 3 is a high-temperature bayonet $H_2SO_4$ decomposer schematic. An insulated base is provided where fluid connections remain cool and silicon carbide materials utilized can withstand boiling sulfuric acid at high temperatures.

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

The present disclosure incorporates herein by reference, and for all purposes, U.S. Pat. No. 7,976,693 and U.S. Pat. No. 3,888,750 which describe a hybrid sulfur process, equipment, and operating conditions for known ways of operating a HyS process.

The simplicity of the HyS cycle is that the two key components of this process lead to a relatively simple operational flowsheet. However, there is more to HyS than just these two operations, and integrating them requires a balancing of competing concerns and interests. In theory, the SDE should be maintained at the highest possible conversion to minimize the recycle of unreacted $SO_2$ and $H_2SO_4$ content. Doing so minimizes the need for further concentration downstream and improved efficiency operations with respect to the overall process.

However, the SDE cannot be operated at high conversion because the cell potential depends on the concentration of $SO_2$ at the anode. It is known that the SDE operates at 40% $SO_2$ utilization, requiring a fairly large recycle stream and leaving a significant $SO_2$ concentration in the anolyte effluent. Consequently, unreacted $SO_2$ needs to be recovered and recycled before feeding the sulfuric acid product to the decomposition reactor.

More importantly, the concentration of sulfuric acid in the anolyte is also limited. Higher $H_2SO_4$ concentration leads to lower $SO_2$ solubility and higher reversible potential. It can also decrease the conductivity of the PEM separator, especially Nafion®, thereby increasing the cell potential. Since efficient operation of the SDE is favored by a more dilute sulfuric acid anolyte, the concentration of $H_2SO_4$ in the anolyte effluent also needs to be increased before it is fed to the bayonet reactor.

The high-temperature decomposition of $H_2SO_4$ is limited by thermodynamic equilibrium and does not achieve complete conversion. The unreacted $H_2SO_4$ needs to be recovered and recycled in addition to the $SO_2$ product having to be separated from the $O_2$ co-product before it can be fed to the SDE. The high-temperature heat requirement is determined by the opportunity for recuperation within the bayonet. Previous work showed that the required heat input is minimized by operating the reactor at the highest possible temperature and pressure, and at a feed concentration of 80.1 wt % $H_2SO_4$.

In accordance with this invention, it has been found that a more concentrated acid feed will actually increase the heating target, while feeding less concentrated acid will cause more water to be vaporized and condensed with incomplete recuperation, thereby consuming more high-temperature heat. Concentrations below 65 wt % $H_2SO_4$ give heating targets in excess of 400 kJ/mol $H_2$ which, when combined with the other process heat and power needs, results in a net thermal efficiency comparable to that of alkaline electrolysis (which is commonly regarded as the benchmark process for making hydrogen from nuclear power). Since the HyS cycle has greater complexity, it will not be more cost-effective than water electrolysis unless it has a significant efficiency advantage. One way to maximize efficiency is to operate the SDE at the highest possible acid concentration without adversely affecting the cell potential.

Earlier modifications to the original HyS process were made in an effort to improve the net thermal efficiency at the high temperature end, which was only 41.7%, higher heating value (HHV) basis. A 950 C ROT process was developed and as best referenced in "Hybrid Sulfur Cycle Flowsheets For Hydrogen Production Using High-Temperature Gas-cooled Reactors", Maximilian B. Gorensek, International Journal of Hydrogen Energy, Volume 36 (2011), pp. 12725-12742 and which is incorporated herein by reference in its entirety. The anolyte acid concentration limitation was removed by the use of an alternative PEM material such as acid-doped PBI instead of Nafion®. The electrical resistivity of acid-doped PBI membranes, which can operate at much higher temperatures than Nafion®, actually decreases with acid concentration. It is believed that the SDE uses a PEM capable of operating at 65 wt % $H_2SO_4$ in the anolyte and at temperatures of 120-140 C. Reversible cell potential increases with acid concentration and temperature, so operating at higher temperatures or concentrations than this may be limited by thermodynamic considerations.

The prior HyS process was modified to reflect operation of the SDE at 120 C and 65 wt % $H_2SO_4$ in the anolyte product. $SO_2$ conversion was also increased from 40% to 50%, and a cell potential of 0.6 V imposed. Water flux across the membrane was set to maintain a ratio of 1 mol $H_2O$/mol $H_2$ product even with the much lower water content of acid doped PBI and other PEM alternatives.

Since a significant water activity gradient will exist between the cathode and anode, a large driving force for water transport is needed to compensate for the reduced water content of the new PEM material. Raising the cell temperature allows heat dissipated in the SDE to be recovered in the acid concentration step downstream. Increasing conversion reduces the quantity of unreacted $SO_2$ that has to be removed and recycled. Raising the anolyte product acid concentration from 50 to 65 wt % $H_2SO_4$ allows the quantity of water that has to be removed in the concentration step (in order to increase the acid concentration of the bayonet reactor feed to 75 wt % $H_2SO_4$) to be reduced by roughly two-thirds. As a result, less than half as much energy is needed to achieve the necessary concentration, so nearly all of the heat input can be provided by recuperation from the SDE and the bayonet reactor.

The water recovered in the acid concentration step is available to absorb $SO_2$ from the uncondensed product of the bayonet decomposition reactor. Since less water is now available for the $O_2$/$SO_2$ separation, a single absorber is no longer sufficient because it would leave too much $SO_2$ behind in the oxygen product. The addition of an absorber/stripper combination reduces the $SO_2$ content of the oxygen co-product to ≤1 ppm using conventional process equipment and without introducing any new reagents. Water is the solvent; the absorber operates at the pressure of the SDE, while the stripper operates at atmospheric pressure, allowing low-pressure steam or recuperation to provide the necessary boil-up. An $SO_2$ compressor with atmospheric pressure feed is already being used to recycle unconverted $SO_2$ recovered from the anolyte product, so the overhead from the stripper can be easily added to the recycle compressor feed.

To accommodate the decrease in ROT from 950 C to 750 C, the present invention sets further numerous modifications to the previous 950 C ROT process. An earlier pinch analysis had shown that the minimum high temperature heat requirement (per unit of $H_2$ production) for the bayonet reactor increases with decreasing operating temperature.

$H_2SO_4$ conversion also suffers, leading to larger quantities of unconverted acid that need to be re-concentrated and recycled. To counter-act the effects of operation with a catalyst bed exit temperature below 700 C, as a result of an ROT of 750 C, the operating pressure of the bayonet $H_2SO_4$ feed was first lowered to 12 bars. This helped minimize the high-temperature heat requirement while recovering at least some of the lost $H_2SO_4$ conversion. A direct contact exchange/quench column was then placed upstream of the bayonet to take advantage of the favorable vapor liquid equilibrium for the $H_2O/H_2SO_4$ system and trap unconverted acid in the liquid phase. This eliminated the unconverted acid recycle stream present in earlier systems. The concentration of the vacuum column bottoms product was increased from 75 to 90 wt % $H_2SO_4$ to reduce the amount of water being fed to the bayonet reactor/quench column combination. Since every mole of water fed exits the loop in the quench overhead and has to be vaporized using high-temperature gas-cooled reactor (HTGR) heat, it is beneficial to limit the volume of water utilized.

In accordance with the present invention, it has been found that using a lower ROT of 750 C results in a less efficient conversion in the bayonet reactor because of the temperature effect on the process equilibrium. Absent process changes, more sulfuric acid would be transferred in a recycle loop to the vacuum column requiring additional heat transfer. The addition of the quench column provides a mechanism to trap $H_2SO_4$ in the loop between the quench column and the bayonet reactor, thereby eliminating the need for a sulfuric acid recycle stream.

The quench column present in the vacuum column allows the sulfuric acid to be concentrated up to about a 90% level. However, since the bayonet reactor operates more efficiently at an acid concentration of about 80%, the quench column dilutes the acid to the more useful concentration by the condensation of a water product generated by the decomposition of water in the bayonet reactor.

The introduction of the quench column and the resulting quench feed also increases the stream temperatures of the bayonet feed stream and exit stream. The higher temperature feeds allow for additional heat recovery in the overall process and reduces the amount of supplemental steam heat input into the overall HyS hybrid cycle.

Additionally, the bayonet effluent was cooled by heat exchange with heat sinks elsewhere in the process using a DOWTHERM® G commercial heat transfer fluid loop before feeding it to the bottom of the direct contact exchange/quench column. The heat sinks provide a significant source of intermediate temperature heat, while diluting the bayonet feed to a near optimal 76 wt % $H_2SO_4$. The net effect of these changes was attainment of an acceptable level for the high-temperature heat requirement for the bayonet reactor while providing sufficient recuperation from the decomposition reaction product streams to eliminate the need for any additional heat input to the balance of the flowsheet.

Aspen Plus (version 7.1) software was used to simulate the flowsheets and determine the performance of individual unit operations. Aspen Energy Analyzer (version 7.1) was used to determine the performance of the bayonet reactor from a pinch analysis based on Aspen Plus simulation data.

Figure 4:
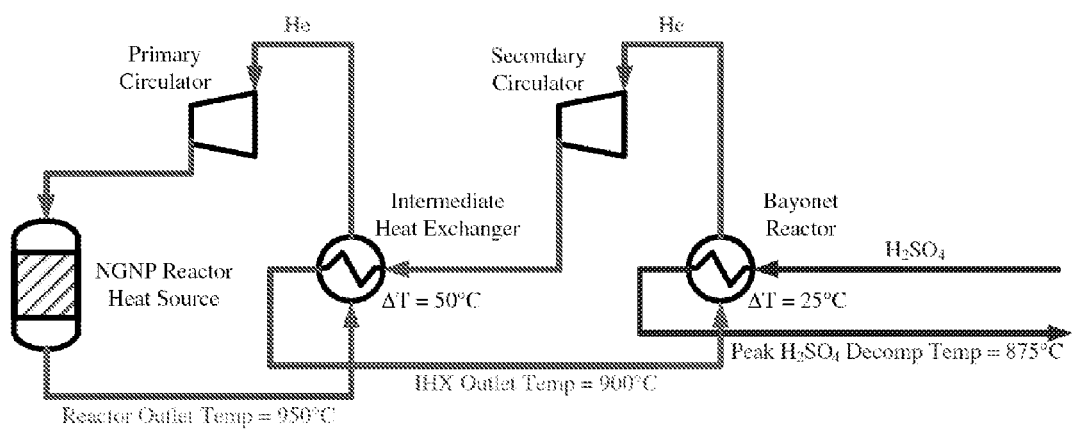
FIG. 4 is a schematic diagram of heat transfer from a nuclear heat source to a bayonet reactor.

The design basis for the 750 C ROT HyS process is summarized below in the second data column in Table 1. As is the case for the comparative 950 C ROT values in Table 1, the flowsheet was sized at a nominal 1-kmol/s production rate, allowing the values of all material (molar, mass, and volumetric) and energy (heat and work) flow rates for a given application to be determined by simply multiplying the tabulated value by the actual hydrogen production rate (in kmol/s). A 750 C ROT implies hot helium is supplied to the bayonet reactor at 700 C due to an assumed 50 C temperature drop across the IHX. An additional 25 C drop between the helium heat transfer medium and the process fluid results in a 675 C peak temperature of $H_2SO_4$ decomposition inside the tip of the bayonet (at the outlet of the catalyst bed). Heat transfer follows the path shown in FIG. 4. The power conversion efficiency of 45% assumes that electricity is provided by a 750 C ROT HTGR power conversion unit (PCU) and is consistent with efficiency projections for NGNP. This PCU could be driven by the same HTGR as the HyS process, or by a separate, electric power HTGR.

Figure 5:
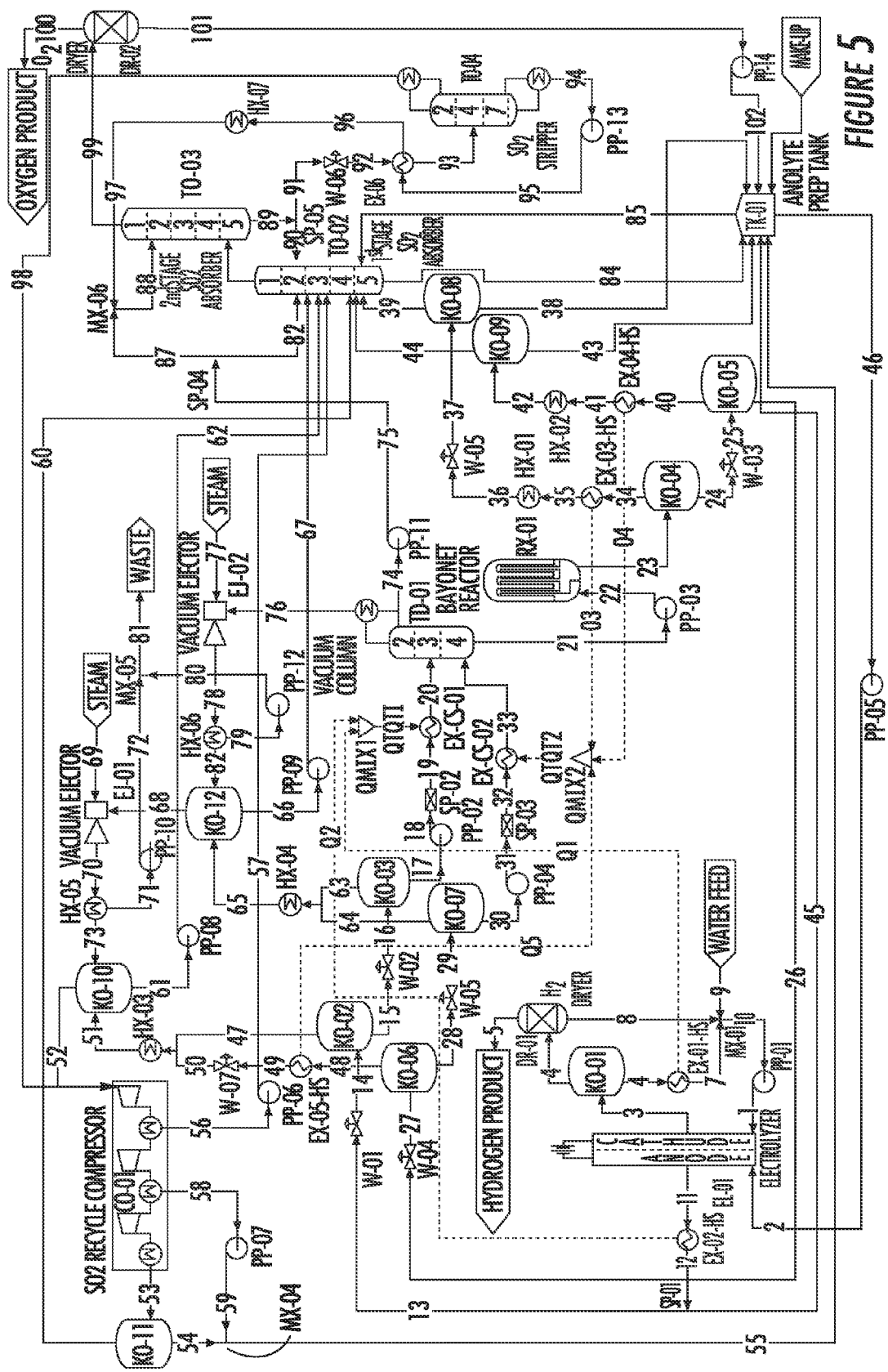
FIG. 5 is a 750 C Reactor Outlet Temperature (ROT) HyS process flowsheet.

The 750 C ROT HyS flowsheet is shown in FIG. 5 and the corresponding stream summary is presented in Table 2. Besides the lower bayonet reactor operating temperature and pressure, this flowsheet differs from the 950 C flowsheet by the addition of a quench column/direct contact exchanger (new TO-02) and elimination of the unconverted acid stream that was recycled to the vacuum column (TO-01). The concentration of the vacuum column bottoms is also increased from 75 to 90 wt % $H_2SO_4$.

Another difference is the addition of the DOWTHERM® G heat transfer fluid loop, which recovers intermediate temperature heat from the bayonet reactor product in heat exchangers HX-01 and HX-02 as well as the quench column (TO-02) condenser, and uses it to heat the vacuum column (TO-01) and SO2 stripper (TO-05) reboilers as well as the steam generator (SG-01) for the vacuum ejectors.

As a result, no external steam heat source is needed; all of the necessary heat is provided by the HTGR heat source through the bayonet reactor. Finally, the addition of some and removal of other unit operations resulted in changes in many stream and equipment identification numbers (e.g. TO-03, TO-04, and TO-05 were changed to TO-04, TO-05, and TO-06, respectively).

Figure 6:
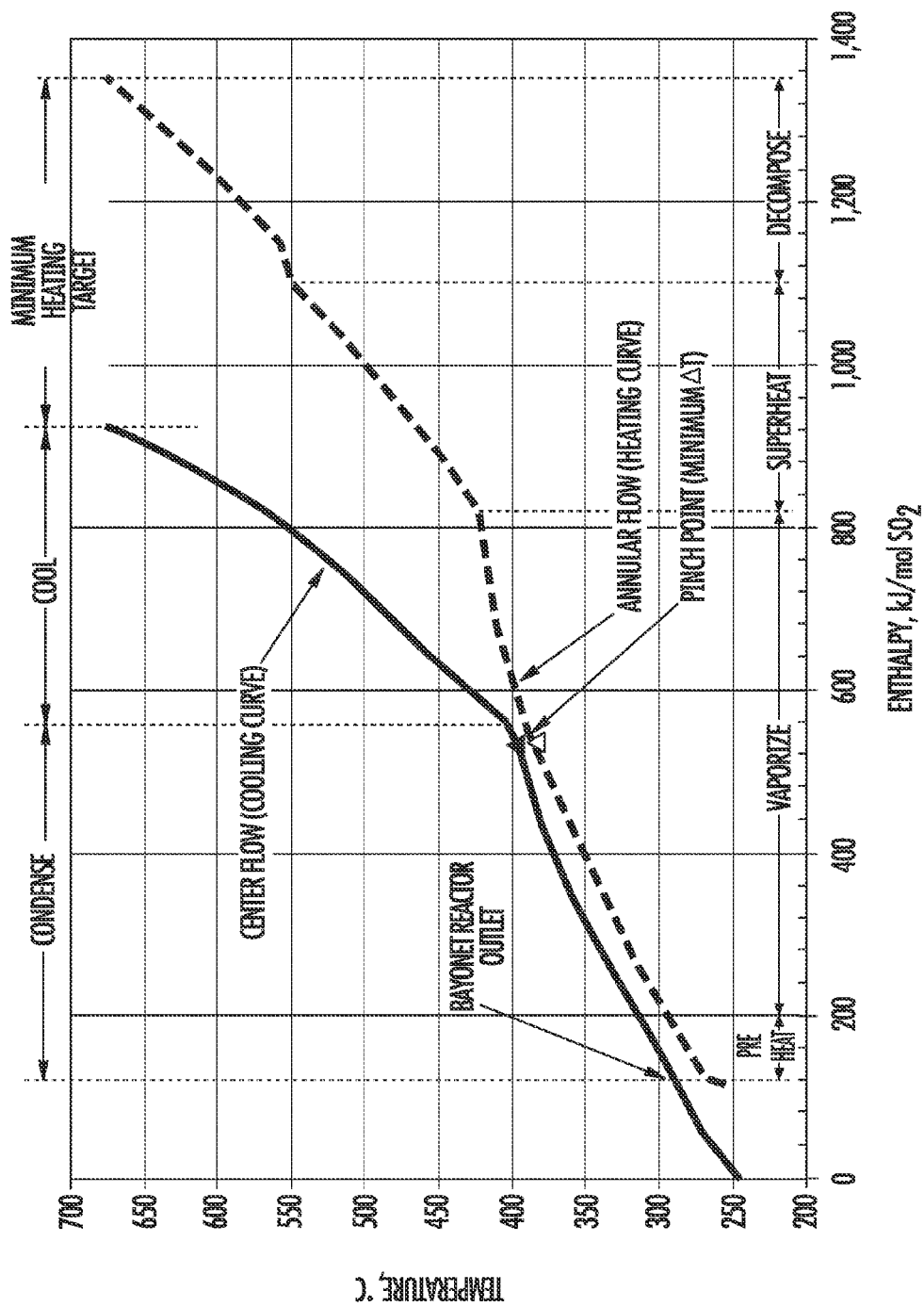
FIG. 6 is a pinch diagram for the bayonet reactor in FIG. 5 (750 C ROT).
Figure 7:
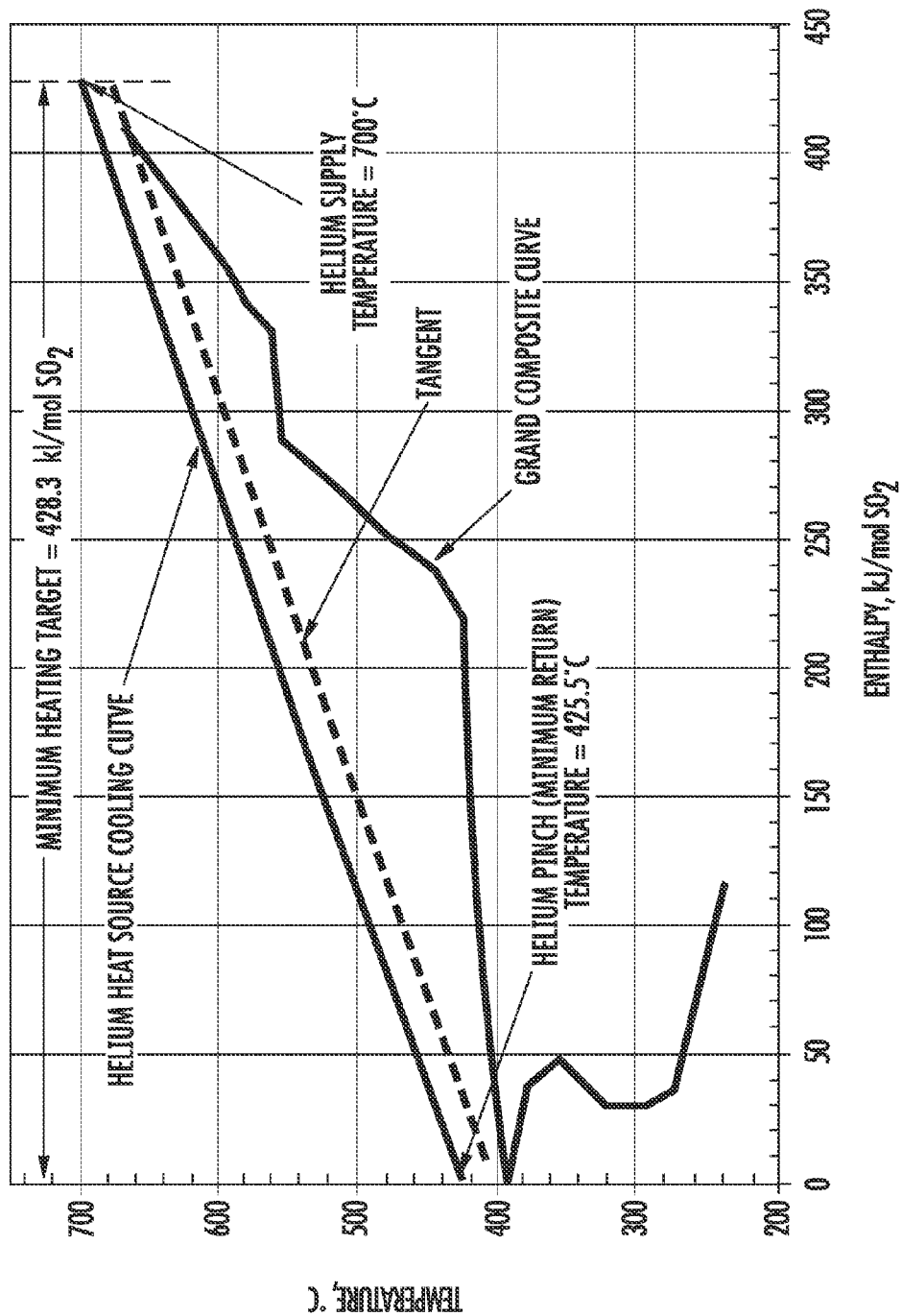
FIG. 7 is a Hot He utility composite curve for RX-01 Bayonet reactor seen in FIG. 5 (750 C ROT).

An energy balance was developed from the simulation results. This is presented in the energy utilization summary (Table 3). Included are the duties and power requirements for all heat exchangers, compressors, pumps, and other energy consumers. Heating and cooling curves were generated using Aspen Plus for all process streams undergoing heat exchange and checked for feasibility. No temperature cross-over was detected; adequate temperature differences were maintained for counter-current heat exchange. The minimum high-temperature heat requirement for the bayonet reactor was determined from a pinch analysis. The heating (annular flow in) and cooling (center flow out) curves are shown in FIG. 6, while the utility composite curve, which demonstrates the operating limits for the secondary helium coolant, is provided as FIG. 7.

As shown in Table 3, the net energy efficiency of the 750 C ROT HyS flowsheet is 39.9%, HHV basis. (Alkaline electrolysis coupled with a PCU operating at 45% conversion efficiency would have an HHV efficiency of 36.2% in comparison.) This is about 1 percentage point lower than expected, based on the drop in energy efficiency for the NGNP PCU (from 48 to 45%) when lowering the ROT from 950 to 750 C. The most likely cause is the significantly increased high-temperature heat requirement for the bayonet reactor, RX-01, (428.3 instead of 340.2 kJ/mol $SO_2$) which implies less efficient utilization. It should be noted again that this number does not include the energy required to provide cooling water. However, the actual power consumption depends on the type of cooling water system used and is not expected to have a significant impact on efficiency.

The new HyS flowsheet presented herein as FIG. 5 achieves significantly higher energy efficiency than alkaline electrolysis coupled with nuclear power. The design of the 750 C ROT flowsheet represents a departure from previous design philosophy in several respects. The pressure differential between the secondary helium coolant and the process fluid, for example, had always been kept to a minimum in order to allow the smallest possible wall thickness for good heat transfer. Given the 40- to 90-bars secondary helium coolant pressure range of the various HTGR options being considered for NGNP, this meant the bayonet would be operated at 40 to 90-bars pressures as well. With the exception of the SDE and the bayonet reactor, only proven, well-understood process technology is used that can be accurately characterized with process models. Furthermore, development of the SDE and the bayonet has advanced to the point where their performance targets appear to be attainable. This gives confidence in the validity of the predicted performance for the HyS cycle.

Lowering the ROT, however, forced a reconsideration of this convention because of the shift in equilibrium conversion. The combination of low temperature and high pressure would have had too negative an impact on the high-temperature (endothermic) decomposition reaction in the bayonet. Moreover, an earlier pinch analysis of the bayonet showed that for ROT below 875 C, the high-temperature heat requirement was minimized by operating at the lowest possible pressure. With that in mind, the process pressure was dropped to 12 bars, which was typical for older sulfuric acid decomposition process designs. Under the bayonet concept, the high pressure (40-90 bars, depending on the NGNP heat source design) would be on the outside (helium side), putting the silicon carbide walls in compression, for which they should be well-suited. Contamination of high-pressure helium with low-pressure sulfuric acid in the event of a leak or failed seal would also be rendered highly unlikely. Consequently, there should not be any real barrier to operating the bayonet reactor at a significantly lower pressure than the helium heat transfer medium. Other heat transfer media such as molten salts, sodium metal or super critical $CO_2$ could also be utilized.

The direct contact exchange/quench column is another departure from previous design philosophy. Boiling sulfuric acid is highly corrosive, especially at temperatures in excess of 100-150 C, so any operation that entailed such conditions had been eschewed. However, the $H_2SO_4$—$SO_3$—$H_2O$ vapor/liquid equilibrium is highly favorable for trapping unreacted $H_2SO_4$ and $SO_3$ in the liquid phase, and it was necessary to take advantage of this in order to overcome the lower conversion resulting from lower temperature operation. Consequently, the temperature at the bottom of the vacuum column was increased by about 50 C and a quench column was added that handles concentrated sulfuric acid in the 230-260 C range.

Using a sulfuric acid decomposition catalyst active in the 550-675 C range, this design allows for a HyS cycle process driven by an advanced nuclear reactor heat source operating at 750 C ROT. The projected 39.9% HHV efficiency is significantly better than that for alkaline electrolysis at 36.2%.

If the SDE is operated at 65 wt % $H_2SO_4$ and the $SO_2$ conversion is increased to 50% by using a PEM material that does not rely on high water content for its conductivity (such as acid-doped PBI) instead of Nafion®, Aspen Plus flowsheet simulation indicates that all of the heat needed to concentrate the bayonet reactor feed can be provided by recuperation from the SDE and from the bayonet product stream. However, the $SO_2/O_2$ separation can no longer be achieved by selective $SO_2$ absorption into the recycled water and acid using a single absorber column. The addition of an absorber/stripper combination provides the necessary separation with a minimal low-quality heat input. Net thermal efficiencies of 44.0% to 47.6%, HHV basis have been projected if the HTGR ROT is 950C.

For the 750 C ROT case, the lower decomposition temperature was accommodated by dropping the bayonet pressure to 12 bars, raising the bayonet feed and outlet temperatures, adding a direct contact exchange/quench column upstream, and increasing the vacuum column bottoms concentration to 90 wt % $H_2SO_4$. Although the minimum heating requirement for the bayonet increased significantly, this was offset by an increase in the opportunity for heat recuperation from the bayonet product that eliminated the need for any additional heat input for acid concentration. A net thermal efficiency of 39.9%, HHV basis is projected for a 750 C HTGR ROT.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

TABLE 1

Design bases for the 950 C. and 750 C. ROT HyS process flowsheets.

|  | 950° C. ROT case | 750° C. ROT case |
| --- | --- | --- |
| Hominal hydrogen production rate | 1 kmol/s | 1 kmol/s |
| Hydrogen product temperature | 48° C. | 48° C. |
| Hydrogen product pressure | 20 bar | 20 bar |
| Oxygen co-product production rate | 0.5 kmol/s | 0.5 kmol/s |
| Oxygen co-product temperature | 48° C. | 48° C. |
| Oxygen co-product pressure | 20 bar | 20 bar |
| Hys SDE (EL-01) operating assumptions |  |  |
| Operating temperature | 120° C. | 120° C. |
| Operating pressure | 22 bar | 22 bar |
| Operating potential | 0.6 V | 0.6 V |
| $SO_2$ concentration in anolyte feed | 11.8 wt % | 11.8 wt % |
| Acid product concentration (anode) | 65 wt % | 65 wt % |
| Conversion (per pass) | 50% | 50% |
| Cathode pressure drop | 1 bar | 1 bar |
| Water-swept cathode water flux (cathode to anode) | 1 kmol/s | 1 kmol/s |
| Anode pressure drop | 1 bar | 1 bar |
| Bayone reactor (RX-01) operating assumptions |  |  |
| Feed pressure | 86 bar | 12.7 bar |
| Pressure drop | 2 bar | 1 bar |
| Feed concentration (quench column) | N/A | 90 wt % |
| Feed concentration (Bayone reactor) | 75 wt % | 76.1 wt % |
| Catalyst bed inlet temperature | 675° C. | 550° C. |
| Catalyst bed exit temperature | 875° C. | 675° C. |
| Minimum ΔT (helium to process) | 25° C. | 25° C. |
| Minimum ΔT (internal recuperation) | 10° C. | 10° C. |
| equilibrium attained in catalyst bed |  |  |
| HTCR operating assumptions |  |  |
| Reactor outlet temperature | 950° C. | 750° C. |
| He coolant supply temperature | 900° C. | 700° C. |

TABLE 1-continued

Design bases for the 950 C. and 750 C. ROT HyS process flowsheets.

|  | 950° C. ROT case | 750° C. ROT case |
|---|---|---|
| Vacuum column (TO-01) operating conditions | | |
| Overhead pressure | 0.11 bar | 0.11 bar |
| Condenser temperature | 44.1° C. | 44.6° C. |
| Bottoms $H_2SO_4$ concentration | 75 wt % | 90 wt % |
| Column pressure drop | 0.02 bar | 0.02 bar |
| Quench column operating conditions | N/A | (TO-02) |
| Overhead pressure | | 11.1 bar |
| Condenser temperature | | 235° C. |
| 1st Stage $SO_2$ absorber operating conditions | (TO-02) | (TO-03) |
| Overhead pressure | 20.9 bar | 20.9 bar |
| Column pressure drop | 0.1 bar | 0.1 bar |
| 2nd Stage $SO_2$ absorber operating conditions | (TO-03) | (TO-04) |
| Overhead pressure | 20.8 bar | 20.8 bar |
| Column pressure drop | 0.1 bar | 0.1 bar |
| $H_2O/O_2$ molar feed ratio | 38 | 40 |
| $SO_2$ stripper operating conditions | (TO-04) | (TO-05) |
| Overhead pressure | 1 bar | 1 bar |
| (Partial-vapor) condenser temperature | 48° C. | 48° C. |
| Bottoms product $SO_2$ concentration[a] | $1.8 \times 10^{-3}$ wt % | $1.4 \times 10^{-3}$ wt % |
| Column pressure drop | 0.1 bar | 0.1 bar |
| Electric power generation efficiency ($KJ_e/KJ_{th}$) | 48% | 48% |

[a] Controlled to achieve 1 ppm $SO_2$ in 2nd stage $SO_3$ absorber overhead product

TABLE 2

| Stream ID | Molar flow rates, kmol/s[a] | | | | | | Temperature, ° C. | K | Pressure, bar | Phase |
|---|---|---|---|---|---|---|---|---|---|---|
|  | $H_2O$ | $H_2SO_4$ | $SO_2$ | $O_2$ | $H_2$ | Total | | | | |
| 1 | 137.20 | 0 | 0 | 0 | 0.04195 | 137.24 | 115.45 | 388.60 | 22.750 | L |
| 2 | 21.834 | 5.7659 | 2 | 4.9E−05 | 0 | 29.600 | 112.50 | 385.65 | 22.750 | L |
| 3 | 136.20 | 0 | 0 | 0 | 1.0420 | 137.24 | 120.00 | 393.15 | 21.750 | L + V |
| 4 | 0.10347 | 0 | 0 | 0 | 1 | 1.1035 | 120.00 | 393.15 | 21.750 | V |
| 5 | 0 | 0 | 0 | 0 | 1 | 1 | 48.00 | 321.15 | 20.000 | V |
| 6 | 136.09 | 0 | 0 | 0 | 0.04195 | 136.13 | 120.00 | 393.15 | 21.750 | L |
| 7 | 136.09 | 0 | 0 | 0 | 0.04195 | 136.13 | 116.00 | 389.15 | 21.000 | L + V |
| 8 | 0.10347 | 0 | 0 | 0 | 0 | 0.10347 | 48.00 | 321.15 | 20.000 | L |
| 9 | 1 | 0 | 0 | 0 | 0 | 1 | 40.00 | 313.15 | 20.000 | L |
| 10 | 137.20 | 0 | 0 | 0 | 0.04195 | 137.24 | 115.42 | 388.57 | 20.000 | L + V |
| 11 | 20.834 | 6.7659 | 1 | 4.9E−05 | 0 | 28.600 | 120.00 | 393.15 | 21.750 | L |
| 12 | 20.834 | 6.7659 | 1 | 4.9E−05 | 0 | 28.600 | 116.00 | 389.15 | 21.000 | L |
| 13 | 3.0796 | 1.0001 | 0.14782 | 7.2E−06 | 0 | 4.2276 | 116.00 | 389.15 | 21.000 | L |
| 14 | 3.0796 | 1.0001 | 0.14782 | 7.2E−06 | 0 | 4.2276 | 105.57 | 378.72 | 1.013 | L + V |
| 15 | 3.0357 | 1.0001 | 0.00862 | 5.5E−09 | 0 | 4.0445 | 103.47 | 376.62 | 1.013 | L |
| 16 | 3.0357 | 1.0001 | 0.00862 | 5.5E−09 | 0 | 4.0445 | 103.47 | 376.62 | 0.330 | L + V |
| 17 | 3.0210 | 1.0001 | 0.00125 | 0 | 0 | 4.0224 | 103.47 | 376.62 | 0.330 | L |
| 18 | 3.0210 | 1.0001 | 0.00125 | 0 | 0 | 4.0224 | 103.47 | 376.62 | 0.430 | L |
| 19 | 3.0210 | 1.0001 | 0.00125 | 0 | 0 | 4.0224 | 103.47 | 376.62 | 0.330 | L + V |
| 20 | 3.0210 | 1.0001 | 0.00125 | 0 | 0 | 4.0224 | 115.29 | 388.44 | 0.130 | L + V |
| 21 | 0.6050 | 1.0001 | 0 | 0 | 0 | 1.6051 | 188.36 | 461.51 | 0.130 | L |
| 22 | 0.6050 | 1.0001 | 0 | 0 | 0 | 1.6051 | 188.71 | 461.86 | 11.100 | L |
| 23 | 5.8682 | 3.4292 | 0.02148 | 0.00113 | 0 | 9.3200 | 256.78 | 529.93 | 11.100 | L |
| 24 | 5.8682 | 3.4292 | 0.02148 | 0.00113 | 0 | 9.3200 | 256.88 | 530.03 | 12.700 | L |
| 25 | 6.8682 | 2.4292 | 1.02147 | 0.50113 | 0 | 10.820 | 287.73 | 560.88 | 11.700 | L + V |
| 26 | 6.8682 | 2.4292 | 1.0215 | 0.50113 | 0 | 10.820 | 245.69 | 518.84 | 11.100 | L + V |
| 27 | 1.6050 | 0.00013 | 1 | 0.5 | 0 | 3.1051 | 235.00 | 508.15 | 11.100 | V |
| 28 | 1.6050 | 0.00013 | 1 | 0.5 | 0 | 3.1051 | 142.37 | 415.52 | 10.500 | L + V |
| 29 | 1.6050 | 0.00013 | 1 | 0.5 | 0 | 3.1051 | 48.00 | 321.15 | 9.900 | L + V |
| 30 | 0.01718 | 0.00000 | 0.86680 | 0.49987 | 0 | 1.3838 | 48.00 | 321.15 | 9.900 | V |
| 31 | 0.01718 | 0.00000 | 0.86680 | 0.49987 | 0 | 1.3838 | 130.20 | 403.35 | 21.100 | V |
| 32 | 0.01718 | 0.00000 | 0.86680 | 0.49987 | 0 | 1.3838 | 48.00 | 321.15 | 21.000 | L + V |
| 33 | 0.00157 | 0.00000 | 0.36103 | 0.49975 | 0 | 0.86235 | 48.00 | 321.15 | 21.000 | V |
| 34 | 0.01561 | 0.00000 | 0.50577 | 0.00011 | 0 | 0.52149 | 48.00 | 321.15 | 21.000 | L |
| 35 | 1.5878 | 0.00013 | 0.13320 | 0.00013 | 0 | 1.7213 | 48.00 | 321.15 | 1.013 | L |
| 36 | 1.5878 | 0.00013 | 0.13320 | 0.00013 | 0 | 1.7213 | 48.16 | 321.31 | 0.913 | L |
| 37 | 17.754 | 5.7658 | 0.85218 | 4.1E−05 | 0 | 24.372 | 116.00 | 389.15 | 0.913 | L |
| 38 | 21.833 | 5.7668 | 1.9991 | 4.9E−05 | 0 | 25.599 | 112.49 | 385.64 | 21.000 | L |
| 39 | 0.04389 | 3.1E−09 | 0.13920 | 7.2E−06 | 0 | 0.18309 | 105.57 | 378.72 | 21.000 | V |
| 40 | 0.04389 | 3.1E−09 | 0.13920 | 7.2E−06 | 0 | 0.18309 | 48.00 | 321.15 | 21.000 | L + V |
| 41 | 0.02044 | 0 | 0.14581 | 7.2E−06 | 0 | 0.16625 | 48.00 | 321.15 | 0.913 | V |
| 42 | 0.00664 | 0 | 0.43063 | 0.00610 | 0 | 0.44337 | 48.00 | 321.15 | 21.000 | L + V |
| 43 | 0.00663 | 0 | 0.42617 | 9.1E−05 | 0 | 0.43290 | 48.00 | 321.15 | 21.000 | L |
| 44 | 0.02847 | 0 | 0.58781 | 9.1E−05 | 0 | 0.61638 | 47.24 | 320.39 | 21.000 | L |
| 45 | 0.04941 | 0 | 0.00141 | 2.3E−08 | 0 | 0.05082 | 48.00 | 321.15 | 2.501 | L |
| 46 | 0.04941 | 0 | 0.00141 | 2.3E−08 | 0 | 0.05082 | 49.13 | 322.28 | 21.000 | L |
| 47 | 0.02184 | 0.0000 | 0.16164 | 4.3E−07 | 0 | 0.18348 | 48.00 | 321.15 | 7.308 | L |
| 48 | 0.02184 | 0.0000 | 0.16164 | 4.3E−07 | 0 | 0.18348 | 49.08 | 322.23 | 21.000 | L |
| 49 | 9.9E−06 | 0 | 0.00445 | 0.00601 | 0 | 0.01047 | 48.00 | 321.15 | 21.000 | V |
| 50 | 0.02441 | 3.1E−09 | 0.00024 | 0 | 0 | 0.02465 | 48.00 | 321.15 | 0.913 | L |
| 51 | 0.02441 | 3.1E−09 | 0.00024 | 0 | 0 | 0.02465 | 49.22 | 322.37 | 21.000 | L |

TABLE 2-continued

| Stream ID | Molar flow rates, kmol/s$^a$ | | | | | | Temperature, °C. | K | Pressure, bar | Phase |
|---|---|---|---|---|---|---|---|---|---|---|
| | $H_2O$ | $H_2SO_4$ | $SO_2$ | $O_2$ | $H_2$ | Total | | | | |
| 52 | 0.01472 | 9.6E−10 | 0.00737 | 5.5E−09 | 0 | 0.02208 | 103.47 | 376.62 | 0.330 | V |
| 53 | 0.01472 | 9.6E−10 | 0.00737 | 5.5E−09 | 0 | 0.02208 | 43.00 | 316.15 | 0.230 | L + V |
| 54 | 0.01029 | 9.6E−10 | 2.4E−05 | 0 | 0 | 0.10031 | 43.00 | 316.15 | 0.230 | L |
| 55 | 0.01029 | 9.6E−10 | 2.4E−05 | 0 | 0 | 0.01031 | 44.25 | 317.40 | 21.000 | L |
| 56 | 0.00463 | 0 | 0.00768 | 5.5E−09 | 0 | 0.01231 | 43.00 | 316.15 | 0.230 | V |
| 57 | 0.08289 | 0 | 0.00000 | 0 | 0 | 0.08289 | 169.98 | 443.13 | 7.908 | L + V |
| 58 | 0.08752 | 0 | 0.00768 | 5.5E−09 | 0 | 0.09520 | 137.12 | 410.27 | 1.013 | V |
| 59 | 0.08656 | 0 | 0.00084 | 0 | 0 | 0.08740 | 48.00 | 321.15 | 0.913 | L |
| 60 | 0.08656 | 0 | 0.00084 | 0 | 0 | 0.08740 | 48.01 | 321.16 | 1.013 | L |
| 61 | 0.00096 | 0 | 0.00685 | 5.5E−09 | 0 | 0.00781 | 48.00 | 321.15 | 0.913 | V |
| 62 | 2.4140 | 0 | 0.00090 | 0 | 0 | 2.4149 | 44.57 | 317.72 | 0.110 | L |

TABLE 3

Electric power requirements

| | | |
|---|---|---|
| EL-01, Electrolyzer | 115.782 | MW$_e$ |
| CO-01, SO$_2$ recycle compressor | | |
| Stage 1 | 2.900 | MW$_e$ |
| Stage 2 | 2.736 | MW$_e$ |
| Stage 3 | 1.765 | MW$_e$ |
| CO-02, SO$_3$/O$_3$ compressor | 3.983 | MW$_e$ |
| PP-01, catholyte feed pump | 0.837 | MW$_e$ |
| PP-02, vacuum column feed pump | 0.001 | MW$_e$ |
| PP-03, quench column feed pump | 0.096 | MW$_e$ |
| PP-04, Bayonet reactor feed pump | 0.067 | MW$_e$ |
| PP-05, quench column overhead condensate pump | 0.052 | MW$_e$ |
| PP-06, anolyte feed pump | 0.155 | MW$_e$ |
| PP-07, first stage intercooler condensate pump | 0.006 | MW$_e$ |
| PP-08, second stage intercooler condensate pump | 0.017 | MW$_e$ |
| PP-09, first flash stage vapor condensate pump | 0.003 | MW$_e$ |
| PP-10, second flash stage vapor condensate pump | 0.003 | MW$_e$ |
| PP-11, first stage ejector condensate pump | 0.000 | MW$_e$ |
| PP-12, vacuum column distillate pump | 0.124 | MW$_e$ |
| PP-13, second stage ejector condensate pump | 0.000 | MW$_e$ |
| PP-14, SO$_2$ stripper bottoms pump | 0.935 | MW$_e$ |
| PP-15, O$_2$ dryer liquids pump | 0.000 | MW$_e$ |
| PP-16, dowtherm pump | 0.332 | MW$_e$ |
| Total electric power requirement | 129.795 | MW$_e$ |
| Heat recuperation summary | | |
| EX-01, catholyte interchanger (EX-01-HS/EX-CS-01, Q1) | 41.772 | MW$_{th}$ |
| EX-02, atholyte interchanger (EX-02-HS/EX-CS-01, Q2) | 11.583 | MW$_{th}$ |
| EX-03, SO$_2$ stripper feed interchanger | 58.748 | MW$_{th}$ |
| Cooling water requirements | | |
| CO-01—SO$_2$ recycle compressor intercoolers | | |
| Stage 1 | 5.139 | MW$_{th}$ |
| Stage 2 | 7.277 | MW$_{th}$ |
| Stage 3 | 11.354 | MW$_{th}$ |
| DR-01, hydrogen dryer | 6.774 | MW$_{th}$ |
| DR-02, oxygen dryer | 0.131 | MW$_{th}$ |
| HX-03, quench column overhead cooler | 55.332 | MW$_{th}$ |
| HX-04, SO$_2$/O$_2$ compressor effluent cooler | 15.818 | MW$_{th}$ |
| HX-05, first acid flash stage condenser | 1.478 | MW$_{th}$ |
| HX-06, second acid flash stage condenser | 0.494 | MW$_{th}$ |
| HX-07, first stage ejector condenser | 3.902 | MW$_{th}$ |
| HX-08, second stage ejector condenser | 0.290 | MW$_{th}$ |
| HX-09, second stage SO$_2$ absorber feed cooler | 23.450 | MW$_{th}$ |
| TO-01 vacuum column condenser | 115.140 | MW$_{th}$ |
| TO-02 quench column condenser | 2.861 | MW$_{th}$ |
| TO-04 SO$_2$ stripper condenser | 24.644 | MW$_{th}$ |
| Total cooling water requirement | 274.084 | MW$_{th}$ |
| Intermediate temperature heat sources | | |
| HX-01, Bayonet reactor effluent cooler | 115.571 | MW$_{th}$ |
| Inlet temperature | 287.7 | |
| Outlet temperature | 245.7 | |

TABLE 3-continued

Electric power requirements

| | | |
|---|---|---|
| TO-02 quench column condenser | 2.861 | MW$_{th}$ |
| Inlet temperature | 256.8 | |
| Outlet temperature | 235.0 | |
| HX-02, quench column overhead cooler | 37.010 | MW$_{th}$ |
| Inlet temperature | 234.4° | C. |
| Outlet temperature | 142.4° | C. |
| Total Intermediate temperature heat sources | 155.443 | MW$_{th}$ |
| Intermediate temperature heat strike | | |
| TO-01 vacuum column reboiler | 102.309 | MW$_{th}$ |
| Inlet temperature | 114.8° | C. |
| Outlet temperature | 188.4° | C. |
| TO-05 SO$_2$ stripper reboiler | 49.027 | MW$_{th}$ |
| Inlet temperature | 101.9° | C. |
| Outlet temperature | 102.3° | C. |
| SG-01, steam generator | 4.106 | MW$_{th}$ |
| Inlet temperature | 37.9° | C. |
| Outlet temperature | 170.1° | C. |
| Total Intermediate temperature heat strike | 155.443 | MW$_{th}$ |
| High-temperature heat requirement | | |
| Secondary helium supply temperature | 700.0° | C. |
| Minimum helium return temperature (utility pinch) | 425.5° | C. |
| Bayonet reactor high temperature heat duty | 428.291 | MW$_{th}$ |
| Power conversion efficiency (kJ$_e$/kJ$_{th}$) | 45% | |
| Thermal equivalent of total electric power requirement | 288.433 | MW$_{th}$ |
| High-temperature (HTGR) heat requirement | 428.291 | MW$_{th}$ |
| Total heat requirement | 716.724 | MW$_{th}$ |
| Higher heating value of hydrogen | 285.291 | MJ/kmol H$_2$ |
| Hydrogen production rate | 1 | kmol/s |
| Equivalent energy content of hydrogen product | 286 | MW$_{th}$ |
| HHV efficiency upper limit | 39.9% | |

That which is claimed:

1. A hybrid sulfur cycle process comprising the steps of:
supplying a heat source of substantially about 750 C;
transferring the heat to a bayonet reactor;
establishing a decomposition temperature for H$_2$SO$_4$ within a catalytic bed housed within the bayonet reactor;
passing the gases of H$_2$SO$_4$ decomposition to a quench column to capture unreacted H$_2$SO$_4$ with additional gasses passing to an electrolyzer unit, the unreacted H$_2$SO$_4$ being concentrated within the quench column to a concentration of about 80%, the 80% concentrated H$_2$SO$_4$ being introduced into the bayonet stream feed;
maintaining a feed pressure of the H$_2$SO$_4$ within the bayonet reactor of substantially about 12 bars;
maintaining a feed pressure of a heat transfer fluid supplied to the bayonet reactor of between about 15-90 bars.

2. The process according to claim 1 wherein the $H_2SO_4$ feed concentration to the bayonet reactor is about 76% by weight.

3. The process according to claim 2 wherein the $H_2SO_4$ feed to the quench column is about 90% by weight.

4. Hybrid sulfur process for hydrogen generation, utilizing the decomposition of $H_2SO_4$ to $H_2O$, $SO_2$ and $O_2$ which comprises: utilizing a hybrid sulfur cycle, wherein an electrolyzer reacts $SO_2$ with $H_2O$ to provide $H_2SO_4$ liquid to a $H_2SO_4$ vaporizer reactor operating at a temperature of about 750 C and at a pressure effective to provide vaporized gaseous $H_2SO_4$ and the gaseous $H_2SO_4$ is decomposed to gaseous $H_2O$, $SO_2$ and $O_2$ in the reactor; concentrating the liquid $H_2SO_4$ product of the electrolyzer to a concentration of at least about 80% before passing it to a quench column; passing the $H_2O$, $SO_2$ and $O_2$ decomposition gases along with unreacted $H_2SO_4$ to the quench column to remove unreacted $H_2SO_4$ from the product with the gases passing to the electrolyzer, the $H_2SO_4$ being adjusted within the quench column to a concentration of about 80%, the 80% concentrated $H_2SO_4$ introduced into the reactor stream feed; inputting electricity to the electrolyzer to produce hydrogen gas and the $H_2SO_4$ liquid; wherein the hybrid sulfur process provides a source for a hydrogen generating process.

5. Hybrid sulfur process for hydrogen generation, utilizing the decomposition of $H_2SO_4$ to $H_2O$, $SO_2$ and $O_2$ consisting essentially of: utilizing a hybrid sulfur cycle, wherein an electrolyzer provides $H_2SO_4$ liquid to a $H_2SO_4$ vaporizer reactor operating at a temperature of about 750 C and at a pressure effective to provide vaporized gaseous $H_2SO_4$ and the gaseous $H_2SO_4$ is decomposed to gaseous $H_2O$, $SO_2$ and $O_2$ in the reactor; passing the $H_2O$, $SO_2$ and $O_2$ product gases together with unreacted $H_2SO_4$ vapor to a quench column to capture unreacted $H_2SO_4$ for recycle with the product gases passing to the electrolyzer, the $H_2SO_4$ being concentrated within the quench column to a concentration of about 80%, the 80% concentrated $H_2SO_4$ being introduced into the reactor stream feed; inputting electricity to the electrolyzer to produce hydrogen gas and the $H_2SO_4$ liquid; wherein the hybrid sulfur process provides a source for a hydrogen generating process.

* * * * *

UNITED STATES PATENT AND TRADEMARK OFFICE
CERTIFICATE OF CORRECTION

PATENT NO.        : 8,956,526 B2
APPLICATION NO.   : 13/570516
DATED             : February 17, 2015
INVENTOR(S)       : Maximillian B. Gorensek Page 1 of 1

It is certified that error appears in the above-identified patent and that said Letters Patent is hereby corrected as shown below:

On the title page item (73), Assignee should be "Savannah River Nuclear Solutions, LLC"

Signed and Sealed this
Ninth Day of June, 2015

Michelle K. Lee
*Director of the United States Patent and Trademark Office*